(12) United States Patent
Finck

(10) Patent No.: US 9,174,531 B2
(45) Date of Patent: Nov. 3, 2015

(54) MODULAR FUEL STORAGE SYSTEM

(71) Applicant: James W Finck, Clarkston, MI (US)

(72) Inventor: James W Finck, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 189 days.

(21) Appl. No.: 13/921,579

(22) Filed: Jun. 19, 2013

(65) Prior Publication Data

US 2014/0375043 A1  Dec. 25, 2014

(51) Int. Cl.
| | |
|---|---|
| *B60K 15/00* | (2006.01) |
| *B60K 15/063* | (2006.01) |
| *B60K 15/03* | (2006.01) |
| *B60K 15/07* | (2006.01) |
| *B62D 25/20* | (2006.01) |

(52) U.S. Cl.
CPC ......... *B60K 15/063* (2013.01); *B60K 15/03006* (2013.01); *B60K 15/07* (2013.01); *B60K 15/00* (2013.01); *B60K 15/03* (2013.01); *B60K 2015/03026* (2013.01); *B60K 2015/0631* (2013.01); *B60K 2015/0633* (2013.01); *B62D 25/20* (2013.01)

(58) Field of Classification Search
CPC ......... B60K 15/00; B60K 15/03; B62D 25/20
USPC .......... 280/783, 830, 831, 834, 838; 224/403, 224/404, 414; 206/462, 471, 485, 486; 220/562, 564, 724, 581, 582, 583, 601, 220/661, 4.12, 4.14

See application file for complete search history.

(56) References Cited

U.S. PATENT DOCUMENTS

| | | | | |
|---|---|---|---|---|
| 6,039,203 | A * | 3/2000 | McDaniel | 220/562 |
| 6,257,360 | B1 * | 7/2001 | Wozniak et al. | 180/69.5 |
| 6,340,105 | B1 * | 1/2002 | Black | 224/404 |
| 6,648,085 | B2 * | 11/2003 | Nagura et al. | 180/65.1 |
| 6,698,211 | B2 | 3/2004 | Gustafson | |
| 6,843,336 | B2 * | 1/2005 | Chernoff et al. | 180/65.1 |
| 6,875,258 | B2 * | 4/2005 | Kuperus | 96/147 |
| 6,905,138 | B2 * | 6/2005 | Borroni-Bird et al. | 280/783 |
| 6,923,282 | B2 * | 8/2005 | Chernoff et al. | 180/65.22 |
| 7,040,691 | B1 * | 5/2006 | Jacobs et al. | 296/193.07 |
| 7,270,209 | B2 | 9/2007 | Suess | |
| 7,624,753 | B2 | 12/2009 | Suess et al. | |
| 8,302,997 | B2 * | 11/2012 | Veenstra | 280/834 |
| 8,469,129 | B2 * | 6/2013 | Mildner et al. | 180/68.5 |
| 2006/0032532 | A1 * | 2/2006 | Suess et al. | 137/266 |
| 2006/0061081 | A1 * | 3/2006 | Kresse et al. | 280/834 |
| 2006/0061117 | A1 * | 3/2006 | Lester et al. | 296/37.6 |

(Continued)

FOREIGN PATENT DOCUMENTS

JP  04266576 A * 9/1992

*Primary Examiner* — Joseph Rocca
*Assistant Examiner* — Daniel Yeagley
(74) *Attorney, Agent, or Firm* — Ralph E. Smith

(57) ABSTRACT

A modular fuel storage system can include a container, a cover, a storage tank and fuel fill and delivery lines. The container can define an interior space therein and the cover can be configured to engage the container to enclose the interior space. The storage tank can be configured to store and selectively deliver a gaseous fuel. The fuel fill and fuel delivery lines can each be fluidly connected to the storage tank. The fill and delivery lines can each have a coupling connector extending external to the container and terminating in a recess formed in an exterior of the container. The modular fuel storage system can be configured to be assembled in the vehicle such that the cover forms a portion of a floor of the vehicle.

18 Claims, 7 Drawing Sheets

(56) References Cited

U.S. PATENT DOCUMENTS

| | | |
|---|---|---|
| 2006/0214415 A1 | 9/2006 | Rife et al. |
| 2008/0178428 A1* | 7/2008 | McDonald ..................... 16/344 |
| 2010/0078244 A1 | 4/2010 | Pursifull |
| 2010/0320794 A1* | 12/2010 | Maceri et al. .............. 296/37.15 |
| 2013/0147227 A1* | 6/2013 | Mather et al. .............. 296/65.09 |
| 2014/0145465 A1* | 5/2014 | Preisler et al. ............... 296/37.5 |

* cited by examiner

MODULAR FUEL STORAGE SYSTEM

FIELD

The present disclosure relates generally to a fuel storage system and, more particularly, to a modular fuel storage system for a vehicle.

BACKGROUND

The use of gaseous fuels, such as hydrogen or compressed natural gas, for vehicles is generally known. Such fuels can represent an alternative to petroleum as a fuel source for motor vehicles, but are generally required to be stored at an elevated or high pressure in a storage tank. Typical storage tanks and their associated mounting systems for compressed gaseous fuels include various components that can raise the cost and complexity of manufacturing an alternative fuel vehicle. In addition, such storage tank systems often result in a loss of interior cabin volume or trunk volume in an automotive vehicle. Thus, there remains a need in the relevant art for a modular fuel storage system that overcomes the aforementioned and other disadvantages.

SUMMARY

In one form, a modular fuel storage system for a vehicle is provided in accordance with the teachings of the present disclosure. The modular fuel storage system can include a container, a cover, a storage tank and fuel fill and delivery lines. The container can define an interior space therein and the cover can be configured to engage the container to enclose the interior space. The storage tank can be configured to store and selectively deliver a gaseous fuel. The fuel fill and fuel delivery lines can each be fluidly connected to the storage tank. The fill and delivery lines can each have a coupling connector extending external to the container and terminating in a recess formed in an exterior of the container. The modular fuel storage system can be configured to be assembled in the vehicle such that the cover forms a portion of a floor of the vehicle.

In another form, a vehicle is provided in accordance with the teachings of the present disclosure. The vehicle can include a modular fuel storage system having a container, a cover, first and second storage tanks, fuel fill and delivery lines and an access door. The container can define an interior space therein and the cover can be configured to engage the container to enclose the interior space. The first and second storage tanks can each be configured to store and selectively deliver a gaseous fuel. The fuel fill and delivery lines can each be fluidly connected to the first and second storage tanks. The fuel fill and delivery lines can each have a coupling connector extending external to the container and terminating in a recess formed in an exterior of the container. The access door can be formed in at least a sidewall of the container, and can be removably coupled to the container. An aperture can be formed in a floor of the vehicle and can be positioned between longitudinally extending frame rails of the vehicle and front and rear wheels of the vehicle. The modular fuel storage system can be configured to be positioned in the aperture and fixed to the vehicle such that the cover forms a portion of the floor of the vehicle. The access door can be accessible from an underside of the vehicle to provide access to control features of the storage tanks while the cover remains engaged to the container.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
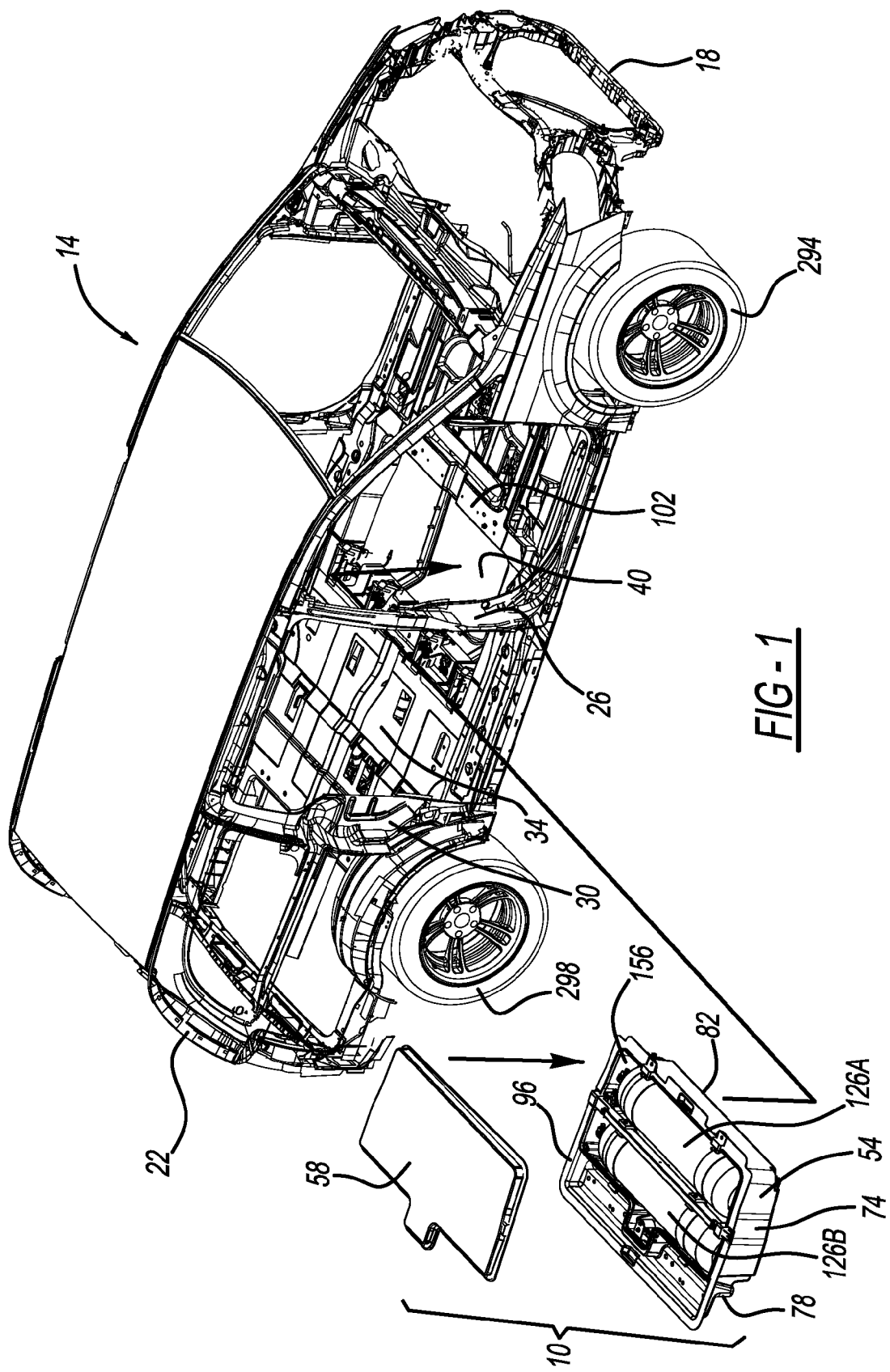
FIG. 1 is a partial perspective view of an exemplary modular fuel storage and delivery system shown in association with an exemplary vehicle according to the principles of the present disclosure.

With initial reference to FIG. 1, an exemplary modular fuel storage system 10 for storage and delivery of a compressed or high pressure gaseous fuel is shown in association with an exemplary vehicle 14 in accordance with the present teachings. In one exemplary configuration, the gaseous fuel can be compressed natural gas. It will be appreciated, however, that various other gaseous fuels can be utilized with the modular fuel storage system 10, such as propane or hydrogen.

In the exemplary configuration illustrated, vehicle 14 is a motor vehicle, such as a minivan, and can include a forward end 18, a rearward end 22, a first door opening 26, a second door opening 30, and a floor 34. In this exemplary configuration, the second door opening 30 can be associated with a second row of seating (not specifically shown) in the minivan, and an aperture 40 can be formed in the floor for receipt of the modular fuel storage system 10, as will be discussed in greater detail below. It should be appreciated that while the discussion will continue with reference to vehicle 14 being a minivan, the modular fuel storage system 10 can be associated with various different vehicle configurations and models.

In one exemplary configuration, the modular storage system 10 can be positioned in a central location of the vehicle and, when utilized in a minivan, can optionally take the place of stowage tubs typically associated with a collapsible second row of seating. It should be appreciated, however, that the modular storage system 10 can also be positioned at a rearward area of the vehicle. The modular fuel storage system 10 can be received in a manufacturing plant as a pre-certified assembly ready to be positioned in the vehicle thereby eliminating a need for installing various individual components associated with modular storage system 10. The modular storage system 10 can also be sealed relative to an interior of the vehicle with a sealable cover that forms a portion of the floor 34 of vehicle 14, as will be discussed in greater detail below.

Figure 1A:
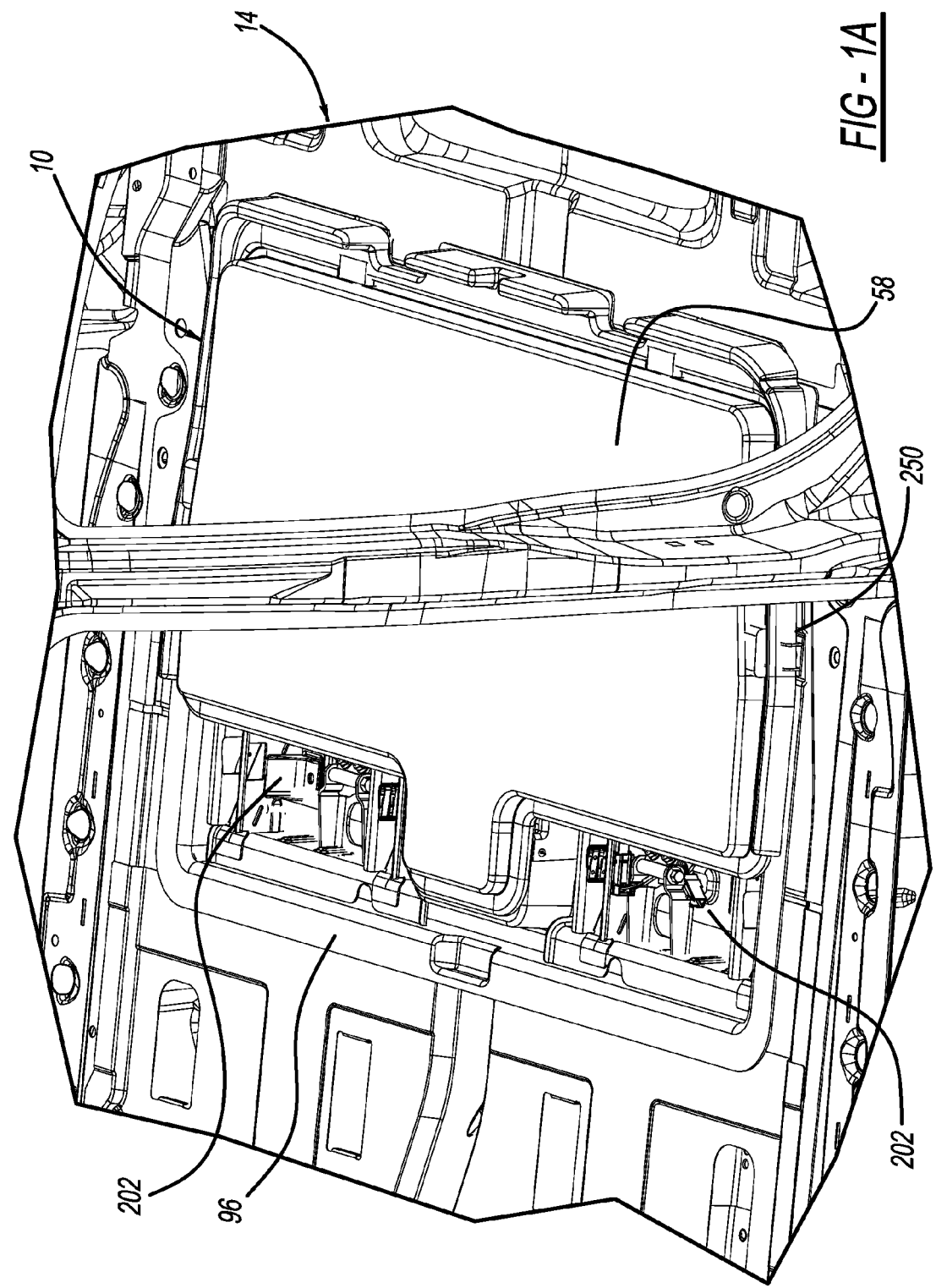
FIG. 1A is a partial perspective view of the exemplary modular fuel storage and delivery system of FIG. 1 positioned in the exemplary vehicle according to the principles of the present disclosure.
Figure 2:
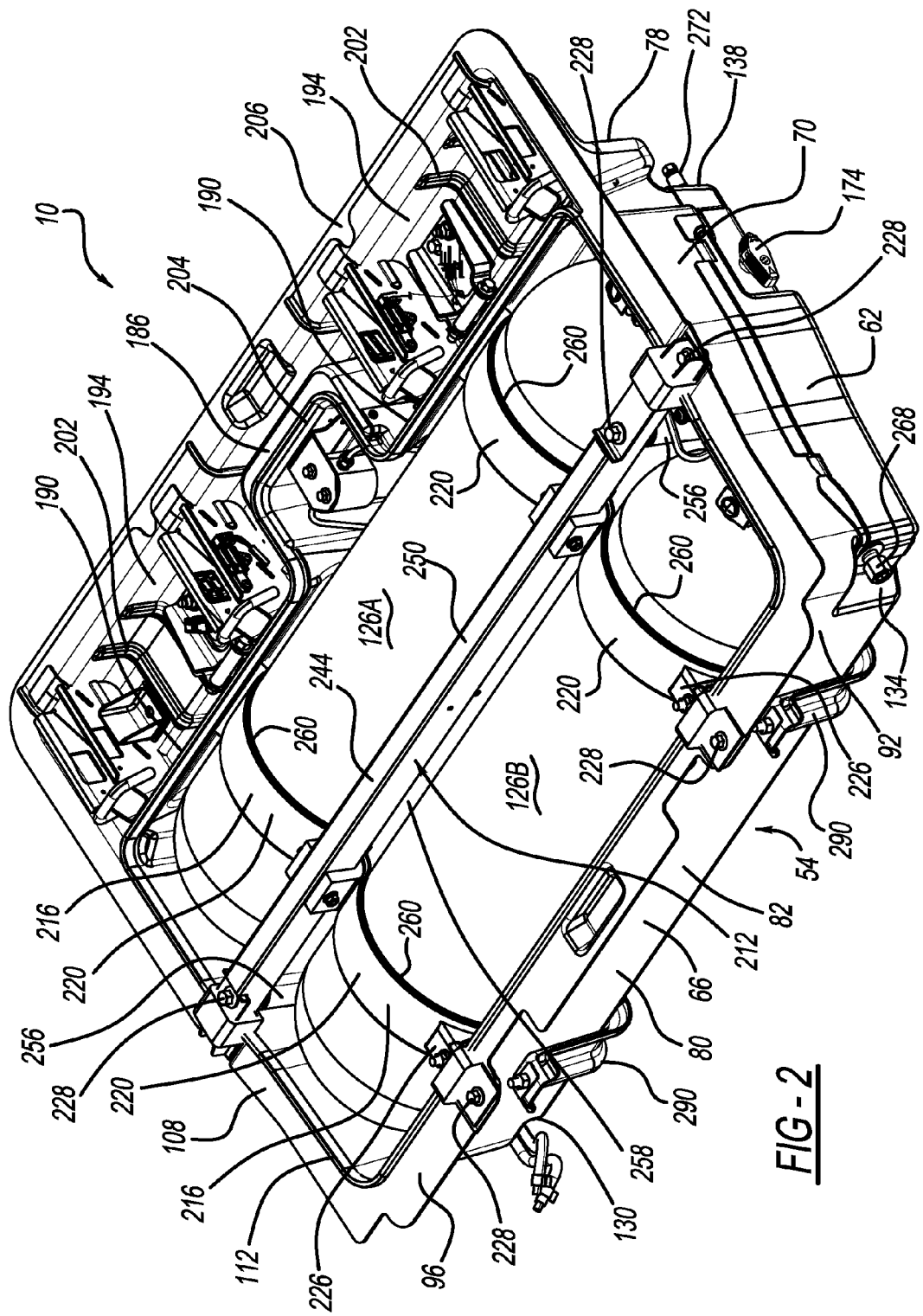
FIG. 2 is a partial top perspective view of the exemplary modular fuel storage and delivery system of FIG. 1 with a load floor cover removed for clarity of illustration according to the principles of the present disclosure.
Figure 3:
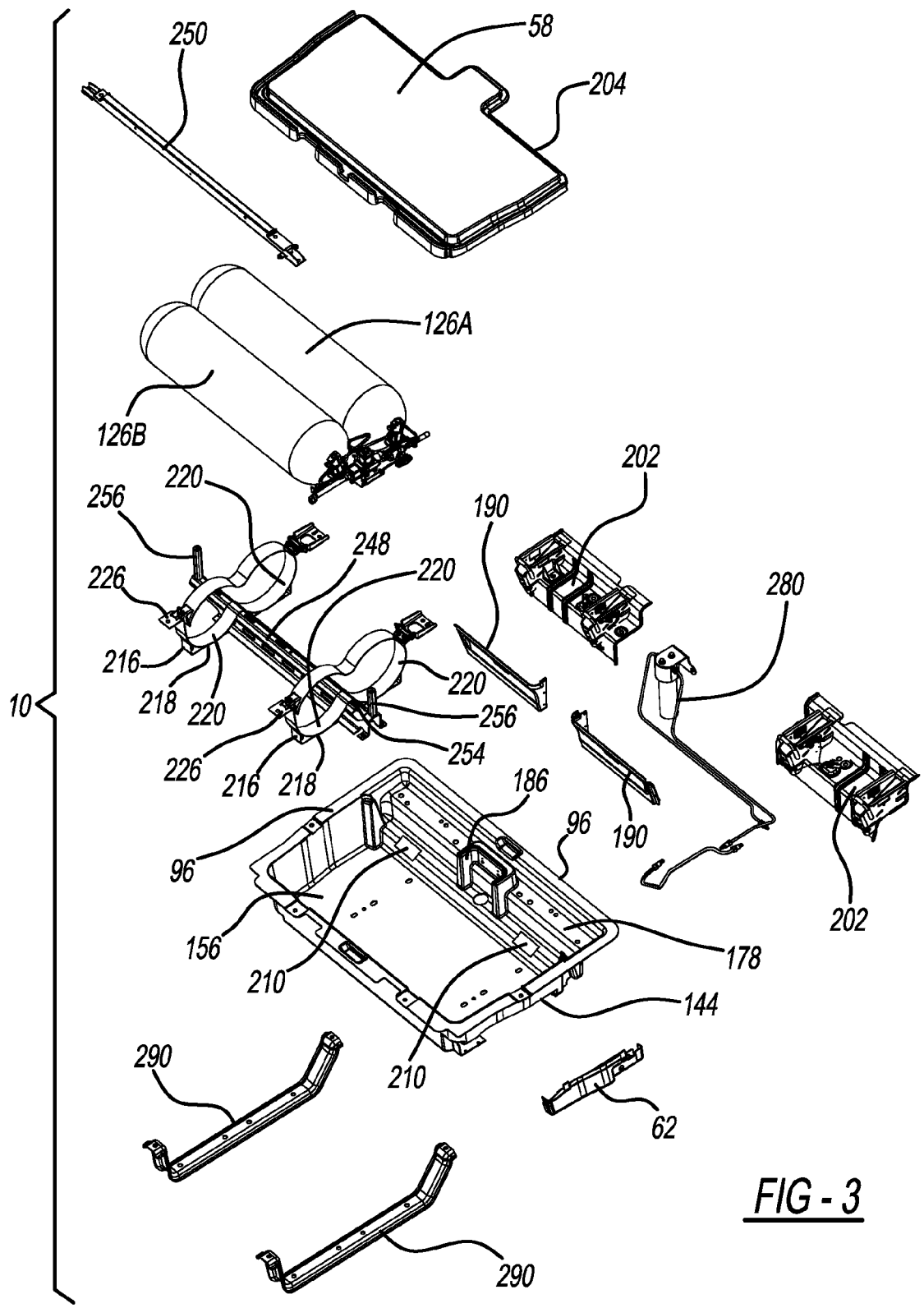
FIG. 3 is an exploded view of the exemplary modular fuel storage and delivery system of FIG. 1 according to the principles of the present disclosure.
Figure 4:
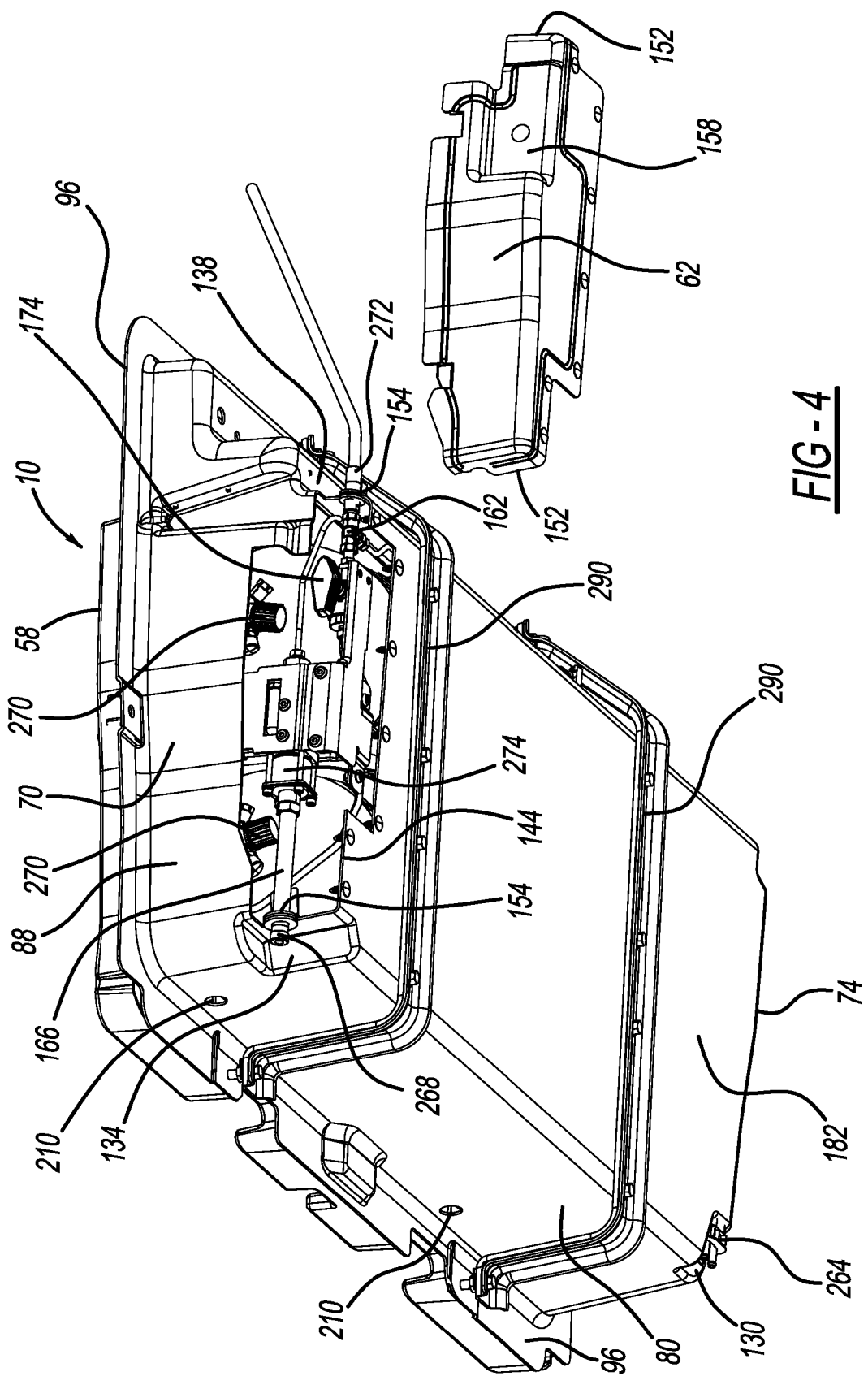
FIG. 4 is a partial bottom perspective view of the exemplary modular fuel storage and delivery system of FIG. 1 with a side access door removed for clarity of illustration according to the principles of the present disclosure.

With additional reference to FIGS. 2-6, modular storage system 10 can include a container or tub 54, a cover 58 and an access door 62, as generally shown in FIGS. 2-4. Container 54 can be configured to receive one or more storage tanks, as generally shown in FIGS. 1-5. In the exemplary configuration illustrated, container 54 can be configured to house two storage tanks, each being of a different size, as will be discussed in greater detail below. Container 54 can include a generally rectangular shape 66 having a longer lateral width than length, where the lateral width can correspond to a cross-car direction, as generally shown in FIGS. 1 and 1A. In this regard, container 54 can include first and second opposed walls or sides 70, 74 (FIGS. 1 and 2) and third and fourth opposed walls or sides 78, 82.

Figure 6:
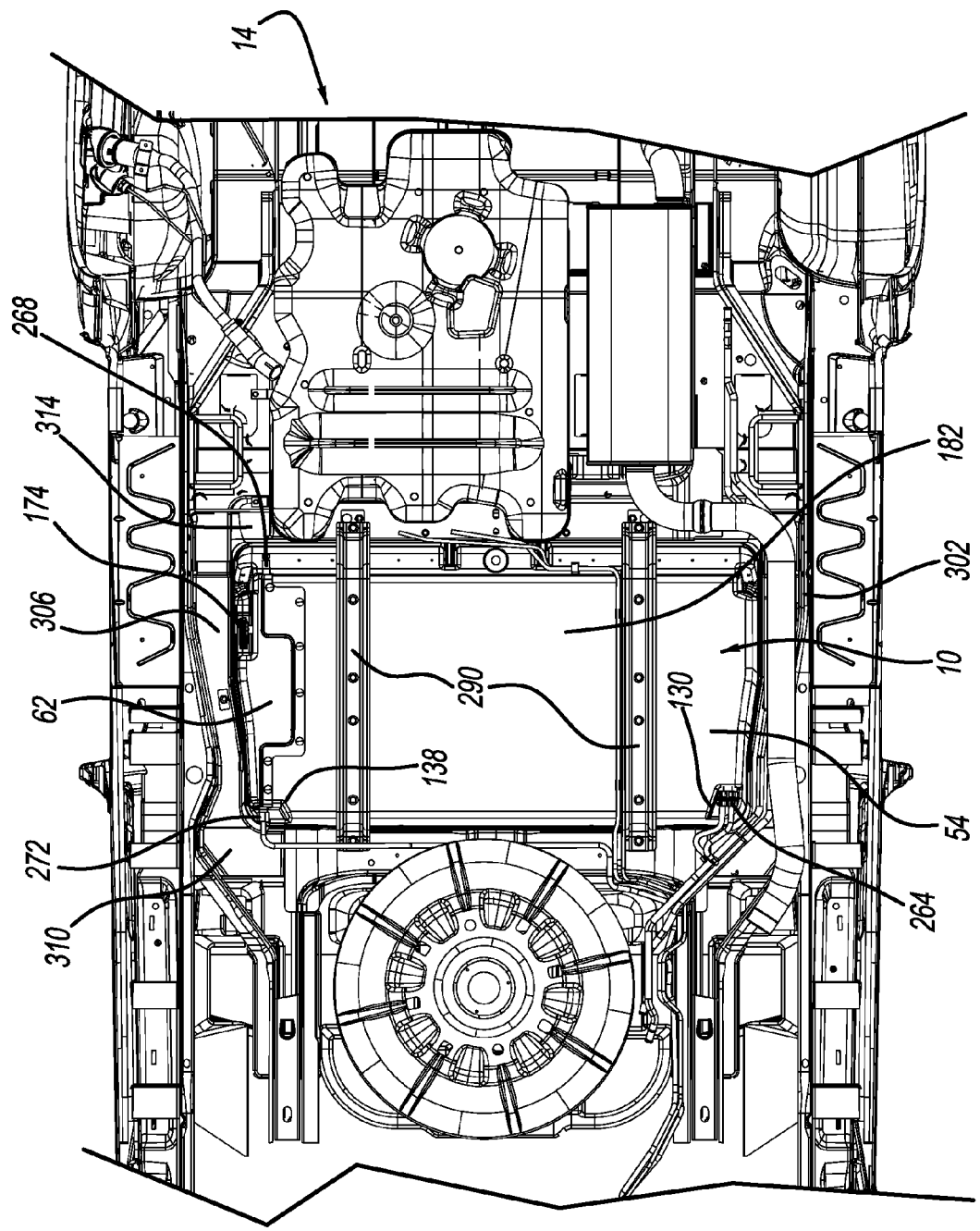
FIG. 6 is a partial bottom view of the exemplary modular storage and delivery system positioned in the exemplary vehicle according to the principles of the present disclosure.

The container 54 can include an outer perimeter 88 sized to be received in and pass through the aperture 40 of floor 34, as generally shown in FIG. 1 with reference to FIG. 6. An upper area or end 92 of container 54 can include a flange 96 extending beyond perimeter 88 and configured to engage a portion of an upper side 102 of floor 34 adjacent aperture 40 when container 54 is positioned therein. A lower side of flange 96 can be sealingly engaged to vehicle floor 34 when container 54 is installed in aperture 40. In one exemplary configuration, the lower side of flange 96 can be glued to the upper side 102 of floor 34 to sealingly secure container 54 thereto. An upper side 108 of flange 96 can also receive a seal 112 associated with container 54 and/or cover 58 to seal cover 58 to container 54.

Figure 5:
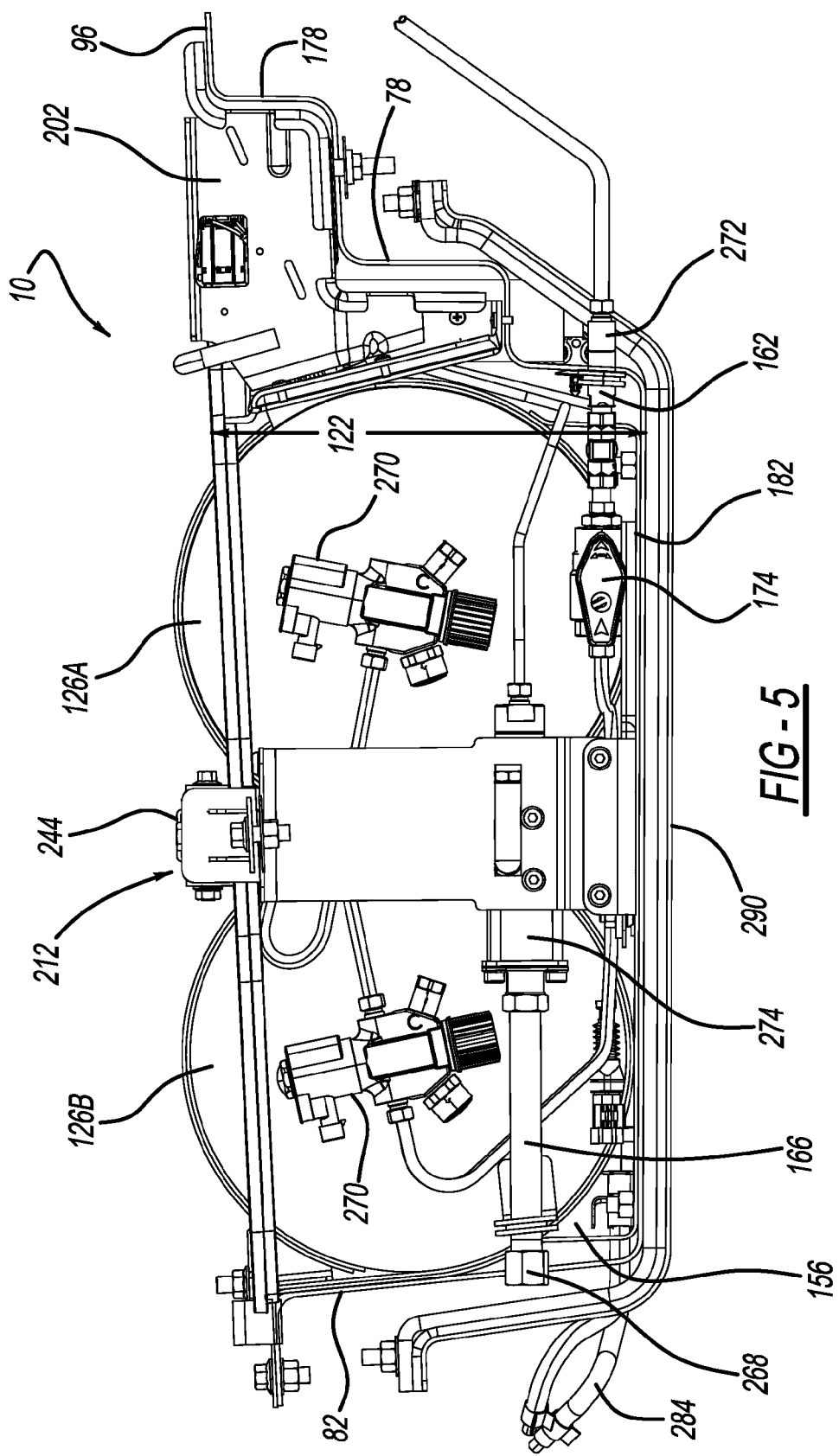
FIG. 5 is a partial side view of the exemplary modular fuel storage and delivery system of FIG. 1 with the cover removed and a portion of a container cut away according to the principles of the present disclosure.

Container 54 can include a greater height or depth 122 adjacent third side 78 as compared to fourth side 82 so as to facilitate housing storage tanks of different sizes, as generally shown in FIG. 5 where storage tank 126A positioned relative to third side 78 has a larger diameter than storage tank 126B positioned relative to fourth side 82. A plurality of depressions or recessed areas 130, 134, 138 can be formed in the exterior of container 54 for facilitating external access to fuel line and coolant line connections, as will be discussed in greater detail below.

An access aperture 144 can be formed in a side of container 54, such as the first side 70 shown in FIG. 4, to facilitate access to operating and control features of the storage tanks 126A, 126B while the modular fuel storage system is assembled to vehicle 14. In this regard, access aperture 144 in connection with removable access door 62 can provide selective access to the operating and control features of tanks 126A, 126B without having to remove cover 58. In one exemplary configuration, access door 62 can form a sealed connection to container 54 when coupled thereto.

In one exemplary configuration, the access aperture 144 can be formed so as to extend from third side 78 to fourth side 82 and intersect with each of the respective recessed areas 134, 138, as shown for example in FIG. 4. Access door 62 can be sized and shaped to cover aperture 144 and conform to a portion of outer perimeter 88 adjacent aperture 144, as generally shown in FIG. 4 with reference to FIG. 2. In the exemplary configuration illustrated, opposed ends 152 of access door 62 can form part of recessed areas 134, 138 and can engage seals 154 to seal connections to feed and supply lines 162, 166 that extend from an inside or interior 156 of container 54 into the recessed areas 134, 138. The access door 62 can also include a recessed area 158 sized and shaped to provide access to a shut-off valve 174 without having to remove access door 62, as generally shown in FIG. 2 with reference to FIG. 4.

The container 54 can also include a stepped configuration 178 extending generally from the flange 96 along the third side 78 at least partially toward a floor or bottom 182 of container 54. An intermediate member 186 can extend upward from the stepped configuration 178 so as to be flush or substantially flush with a plane encompassing flange 96, as generally shown in FIG. 2. Intermediate member 186 can serve as a structural member to support a portion of seal 112 as well as a pair of bulkheads 190 that can optionally be positioned between intermediate member 186 and respective sides 70, 74. A pair of stepped areas 194 can be formed by the bulkheads 190, intermediate member 186 and associated sides of the container, as also shown in FIG. 2. These stepped areas 194 can receive optionally integrated seat mounting brackets 202, as can be seen in FIGS. 2 and 3.

It should be appreciated that modular fuel storage system 10 can include container 54 with or without the bulkheads 190, intermediate member 186 and seat mounting brackets 202. In a configuration including seat mounting brackets 202, seal 112 and cover 58 can follow a perimeter 204 established by the sides 70, 74, 82, the bulkheads 190 and the intermediate member 186, thereby providing access to the seat mounting brackets 202 while sealing an interior of container 54 within perimeter 204. In a configuration that does not include optional seat mounting brackets 202, cover 58 and seal 112 can align with perimeter 204 or, alternatively can align with a perimeter 206 (FIG. 2) established by flange 96. In the latter scenario, the bulkheads 190, intermediate member 186 and seat mounting brackets 202 can optionally not be included with the modular fuel storage system 10.

As briefly discussed above, container 54 can house one or more compressed or high pressure storage tanks, such as tanks 126A and 126B. In the exemplary configuration illustrated, two cylindrical tanks 126A and 126B can be housed in the interior 156 of container 54 with one of the tanks, 126A, including a larger diameter than tank 126B. It will be appreciated, however, that a single tank or multiple tanks of the same or varying widths or diameters can be utilized with container 54. In the exemplary configuration illustrated, tanks 126A and 126B can be positioned contiguous to each other and can extend along a longitudinal length of container 54, which when positioned in vehicle 14, can extend cross-vehicle or substantially perpendicular to a longitudinal axis of vehicle 14.

As container 54 can be sealed relative to the interior of the vehicle when cover 58 is removably secured thereto, one or more flapper or check valves or vents 210 can be provided in one of the sides 70, 74, 78, 82 of container 54. In one exemplary configuration illustrated in FIG. 3, valves/vents 210 can be positioned in side 78, which is orientated facing rearward when installed in vehicle 14. This rearward facing orientation can shield or substantially shield valve 210 from road debris and the like during operation of vehicle 14. It should be appreciated, however, that the valves/vents can also be positioned in container 54 such that they are forward or side facing when storage system 10 is installed in vehicle 14.

Tanks 126A, 126B can include a retainer assembly 212 configured to support and maintain a predetermined position of tanks 126A, 126B in the interior 156 of container 54 and relative to the vehicle 14. Retainer assembly 212 can include one or more tank strap sets 216 each having a housing 218 with one or more ring-shaped portions 220 sized and shaped to correspond to the width and exterior shape of tanks 126A, 126B, as generally shown in FIG. 3. Each tank strap set 216 can include a first member 226. The first member 226 can extend from a side of housing 218 and can be configured to be secured to the vehicle 14 adjacent aperture 40 with fasteners 228. In one exemplary configuration, the first member 226 can be secured to vehicle 14 to thereby removably secure tanks 126A, 126B thereto, as generally shown in FIG. 2 with reference to FIGS. 1 and 1A. In this exemplary configuration, the retainer assembly 212 can secure the tanks 126A, 126B to the vehicle 14 independent of the container 54.

In the exemplary configuration illustrated, retainer assembly 212 can include a pair of tank strap sets 216 each having two ring-shaped portions 220 for engagement with tanks 126A, 126B, as shown for example in FIGS. 2 and 3. A retention and handle assembly 244 can be integrally formed with or coupled to retainer assembly 212, as generally show in FIGS. 2 and 3. Retention and handle assembly 244 can include a lower portion 248 and an upper portion 250. The lower portion 248 can be positioned in a lower space 254 formed between ring-shaped portions 220 such that the lower portion 248 extends substantially along a longitudinal length of tanks 126A, 126B and connects to each tank strap set 216. In the exemplary configuration illustrated, each tank strap set 216 is positioned relative to opposed ends of tanks 126A, 126B, as shown for example in FIG. 2.

The lower portion 248 can be connected at each end thereof to upper portion 250 via a shoulder bar 256, as shown for example in FIG. 3. Upper portion 250 can extend, in one exemplary configuration, along an upper space 258 between tanks 126A, 126B from the first side 70 to the second side 74, as generally shown in FIG. 2. Tightening the upper portion 250 to the shoulder bar 256 can force the ring shaped portions 220 of tank strap sets 216 downward in space 258 thereby tightening tank strap sets 216 around tanks 126A, 126B. In one exemplary configuration, ring-shaped portions 220 can include a rubber liner 260 on an inside thereof configured to engage tanks 126A, 126B when secured thereto, as shown for example in FIG. 3. Upper portion 250 can thus include a longer longitudinal length than lower portion 248 and can be secured to vehicle 14 at its opposed ends, as also shown in FIG. 2 with reference to FIG. 1A. In operation, retention and handle assembly 244 can both serve as a structure to secure tanks 126A, 126B to each other and to vehicle 14 (e.g., floor 34) via fasteners 228, as well as a mechanism for carrying tanks 126A, 126B to and from container 54. For example, once the relevant portions of handle assembly 244 are unsecured from vehicle 14 and container 54 (along with first members 226), the upper portion 250 of retention and handle assembly 244 can be grasped to lift and remove tanks 126A, 126B from container 54 and vehicle 14. Tanks 126A, 126B can then be carried while being coupled to each other via assembly 244.

With particular reference to FIG. 5 and continuing reference to FIGS. 1-4 and 6, tanks 126A, 126B can each include a valve 270 operably connected to a pressure regulator 274. Pressure regulator 274 can be fluidly coupled to both valves 270 along with the feed and supply lines 162, 166 and a filter system 280, as generally shown in FIG. 5 with reference to FIG. 3. Coolant lines 284 can be coupled to the pressure regulator 274 and can be operable to control a temperature of the pressure regulator 274 and associated control components as a result of pressure changes during operation or use of compressed natural gas stored in tanks 126A, 126B.

With particular reference to FIGS. 2 and 4, the recessed areas 130, 134 and 138 can be sized and shaped so as to extend beyond the respective coolant lines 284 external connection 264, supply line 166 external connection 268, and fill line 162 external connection 272. This feature can, among other things, serve to protect the external connections 264, 268, 272 during transport, vehicle assembly and operation or modular fuel storage system 10. The modular fuel storage system 10 can be configured as a pre-certified, drop-in modular assembly for its associated vehicle. Necessary connections to vehicle 14 can be accomplished via the external connection capability of container 54 (e.g., external connections 264, 268 and 272). In the exemplary configuration illustrated, external connections 264, 268 and 272 can be quick-connections for ease of manufacturability and/or serviceability.

With particular reference to FIGS. 2, 4 and 6, modular fuel storage system 10 can include one or more skid plate support straps 290. Straps 290 can be sized and shaped to conform to an outer shape of container 54 so as to engage at least a portion of sides 78 and 82 and bottom 182. In the exemplary configuration illustrated, modular fuel storage system 10 can include two straps that extend along bottom 182 and sides 78, 82 so as to be secured to an underside of floor 34 (or adjacent chassis/frame component), as generally shown in FIG. 4 with reference to FIG. 6. Straps 290 can be structurally designed to not only aid in supporting container 54, but also serve as check straps or skid plates to protect the container from any potential under-vehicle hazards. For example, straps 290 can prevent or substantially prevent the bottom 182 of container 54 from being dented or pushed inward due to contact with such under-vehicle hazards.

In operation, and with particular reference to FIG. 1, modular fuel storage system 10 can be assembled to minivan vehicle 14 through the second or rear door opening 30. The modular system 10 can be positioned in aperture 40 from an upper side 102 of floor 34, as also shown in FIG. 1. The flange 96 can be sealed to floor 34 and the cover 58 can be semi-permanently sealed to container 54 so as to seal modular system 10 relative to an inside of the passenger compartment of vehicle 14, while allowing the interior 156 of container 54 to vent to the atmosphere via vents or valves 210. As discussed above, cover 58 can form a portion of floor 34 of vehicle 14 when modular system 10 is assembled thereto. In one exemplary configuration, the modular system 10 can be installed in the vehicle as a complete, pre-certified assembly with all necessary connections to vehicle components being accessible and handled external to the interior 156 of container 54.

The modular fuel storage system 10 can be centrally positioned in vehicle 14 between front and rear axles/wheels 294, 298, as generally shown in FIGS. 1 and 6. In the exemplary configuration illustrated in FIGS. 1 and 6, the modular system 10 can be positioned between longitudinally extending frame rails 302, 306 and vehicle cross-members 310, 314. In this exemplary configuration, straps 290 can be coupled to cross-members 310, 314.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A modular fuel storage system for a vehicle, comprising:
a container defining an interior space therein, the container including an access aperture and an access door configured to removably engage the container to cover the access aperture when engaged to the container wherein the access door includes a recess configured to receive a shut-off valve extending from the interior space, the shut-off valve terminating within the recess;
a cover configured to engage the container to enclose the interior space;
a storage tank configured to store and selectively deliver a gaseous fuel; and
a fuel fill line and a fuel delivery line each fluidly connected to the storage tank, the fill and delivery lines each having a coupling connector extending external to the container and terminating in a recess formed in an exterior of the container;
wherein the modular fuel storage system is configured to be assembled in the vehicle such that the cover forms a portion of a floor of the vehicle.

2. The modular fuel storage system of claim 1, wherein the container includes sidewalls and a bottom cooperating to define the interior space, and a flange extending from an upper end of the container opposite the bottom.

3. The modular fuel storage system of claim 2, wherein the modular fuel storage system is configured to be positioned in an aperture extending through the floor of the vehicle such that the flange engages a portion of the floor adjacent the aperture and the cover encloses the cavity and forms the portion of the floor.

4. The modular fuel storage system of claim 3, wherein the modular fuel storage system is configured to be positioned in the vehicle between longitudinally extending frame rails and front and rear wheels of the vehicle.

5. The modular fuel storage system of claim 4, wherein the modular fuel storage system is configured to be positioned in the vehicle between cross members extending between the frame rails and between the front and rear wheels.

6. The modular fuel storage system of claim 1, wherein the storage tank includes two storage tanks.

7. The modular fuel storage system of claim 6, further comprising a pressure regulator fluidly coupled to the two storage tanks and housed in the interior space of the container.

8. The modular fuel storage system of claim 7, wherein the interior space is sealed to a passenger compartment of the vehicle.

9. The modular fuel storage system of claim 6, wherein the two storage tanks include two cylindrical storage tanks with one of the tanks including a larger diameter than the other of the tanks.

10. The modular fuel storage system of claim 6, further comprising:
a retainer strap assembly including first and second cylindrical shaped openings configured to engage the respective two storage tanks; and
a longitudinally extending retention member configured to extend substantially between and along a length of the two tanks, the retention member coupled to the strap assembly.

11. The modular fuel storage system of claim 10, wherein the retainer strap assembly includes first and second retainer strap assemblies spaced apart from each other along the length of the two tanks, the first and second retainer strap assemblies removably connected to the vehicle, the retention member connected to the first and second retainer strap assemblies and removably connected to the vehicle, the and first and second opposed sides of the container facing respective ends of the two storage tanks.

12. A modular fuel storage system for a vehicle, comprising:
a container defining an interior space therein;
a cover configured to engage the container to enclose the interior space;
a storage tank configured to store and selectively deliver a gaseous fuel;
a pair of seat brackets positioned in the interior space and fixed to the container; and
a fuel fill line and a fuel delivery line each fluidly connected to the storage tank, the fill and delivery lines each having a coupling connector extending external to the container and terminating in a recess formed in an exterior of the container;
wherein the modular fuel storage system is configured to be assembled in the vehicle such that the cover forms a portion of a floor of the vehicle.

13. The modular fuel storage system of claim 12, wherein the pair of seat brackets includes two pair of seat brackets, and wherein the cover is sized and shaped so as to provide access to the seat brackets while sealing the interior space containing the storage tank relative to the environment.

14. A vehicle comprising:
a modular fuel storage system for a the vehicle, including:
a container defining an interior space therein;
a cover configured to engage the container to enclose the interior space;
a first and a second storage tank each configured to store and selectively deliver a gaseous fuel;
a fuel fill line and a fuel delivery line each fluidly connected to the first and second storage tanks, the fill and delivery lines each having a coupling connector extending external to the container and terminating in a recess formed in an exterior of the container;
an access door formed in at least a sidewall of the container, the access door removably coupled to the container;
an aperture formed in a floor of the vehicle, the aperture positioned between longitudinally extending frame rails of the vehicle and between front and rear wheels of the vehicle;
wherein the modular fuel storage system is configured to be positioned in the aperture and fixed to the vehicle such that the cover forms a portion of the floor of the vehicle, and wherein the access door is accessible from an underside of the vehicle to provide access to control features of the storage tanks while the cover remains engaged to the container.

15. The vehicle of claim 14, wherein the modular fuel storage system comprises a pair of seat brackets positioned in the interior space and fixed to the container.

16. The vehicle of claim 15, wherein the modular fuel storage system comprises a retainer assembly, the retainer assembly coupled to each storage tank and including a retention member positioned between the storage tanks and removably coupled to the vehicle proximate opposed sides of the aperture.

17. The vehicle of claim 15, wherein the interior space of the container is sealed relative to an interior of the vehicle when the cover is engaged to the container.

18. The vehicle of claim 14, wherein the first and second storage tanks include cylindrical storage tanks with one of the first and second storage tanks including a larger diameter than the other of the first and second storage tanks.

* * * * *